United States Patent [19]

Black

[11] 3,948,537

[45] Apr. 6, 1976

[54] HAND TRUCK

[75] Inventor: Michael Arthur Black, Tustin, Mich.

[73] Assignee: Brooks & Perkins, Incorporated, Southfield, Mich.

[22] Filed: Jan. 6, 1975

[21] Appl. No.: 538,531

[52] U.S. Cl............................ 280/36 C; 280/47.29
[51] Int. Cl.² ........................................... B62B 1/04
[58] Field of Search.......... 280/47.28, 47.29, 47.27, 280/36 C, 41 C

[56] References Cited
UNITED STATES PATENTS

| | | | |
|---|---|---|---|
| 2,792,233 | 5/1957 | Stackhouse | 280/47.28 |
| 2,845,278 | 7/1958 | Breeler | 280/47.29 X |

FOREIGN PATENTS OR APPLICATIONS

| | | | |
|---|---|---|---|
| 649,799 | 8/1949 | United Kingdom | 280/47.27 |
| 794,439 | 5/1958 | United Kingdom | 280/47.27 |

Primary Examiner—Robert R. Song
Assistant Examiner—John A. Pekar
Attorney, Agent, or Firm—Whittemore, Hulbert & Belknap

[57] ABSTRACT

A hand truck intended primarily for transporting luggage comprising an elongated generally rectangular back frame having an elongated generally rectangular nose extension pivoted thereto adjacent the lower end of the frame. The pivot connection is established by hinge brackets fixedly secured to the nose extension and pivoted to the back frame on an axis adjacent the lower end of the back frame. Wheel support brackets mount a pair of wheels substantially rearwardly of the lower end of the back frame. The hinge brackets include angularly disposed flat support surfaces adapted to engage the ground or floor when the nose extension is in the loading position or the generally upright rest position.

15 Claims, 8 Drawing Figures

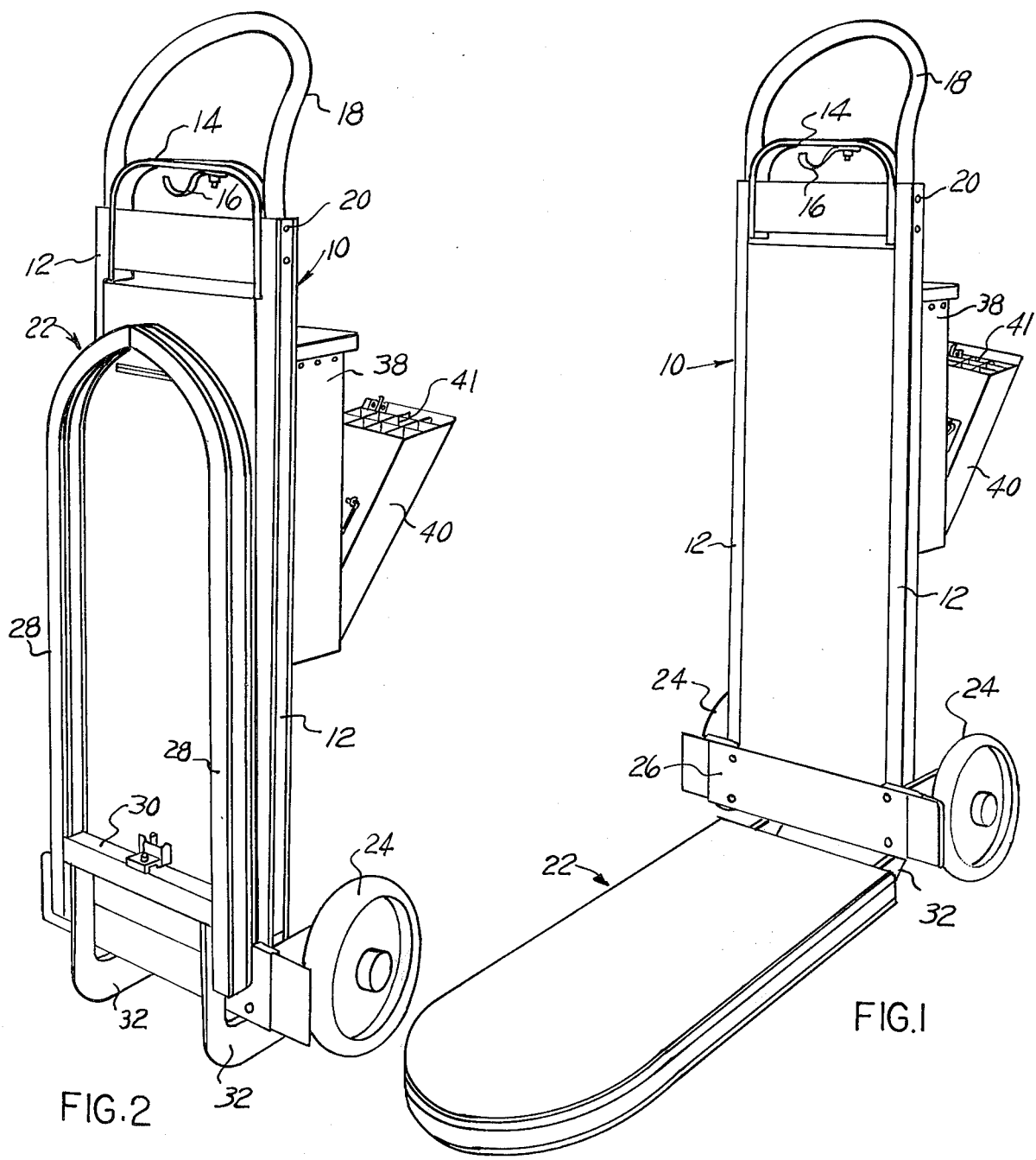
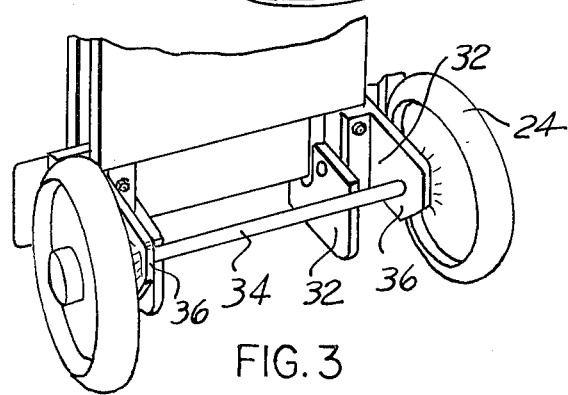
FIG.1
FIG.2
FIG.3

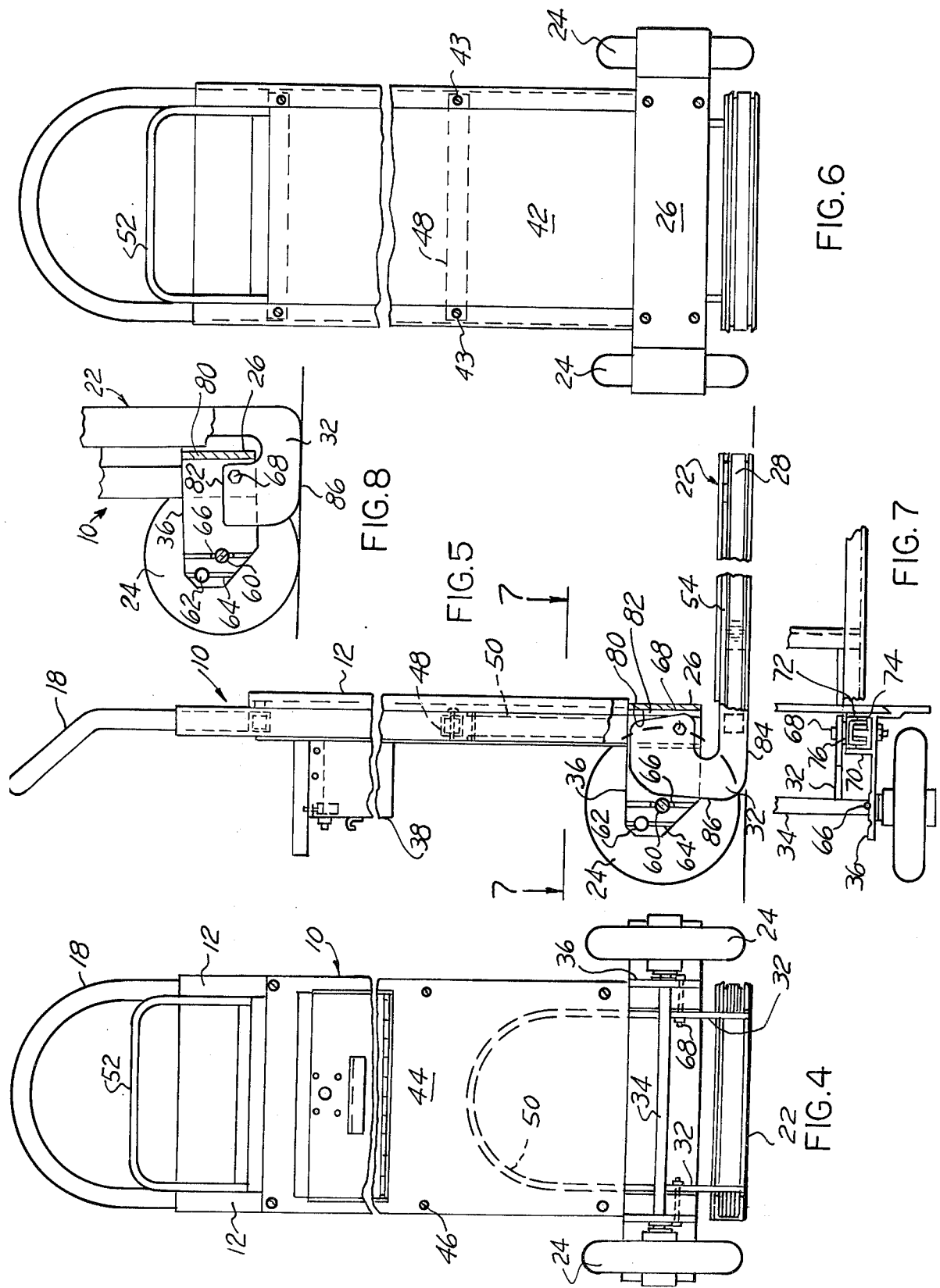

HAND TRUCK

BRIEF SUMMARY OF THE INVENTION

A hand truck is provided comprising a back frame adapted to extend generally vertically in a rest or loading position and to be inclined rearwardly during movement of the truck. Pivoted to the lower end of the back frame is a nose extension which constitutes a luggage supporting platform. When the truck is in loading position the nose extension is pivoted to extend forwardly from the lower end of the back frame and to rest against the floor.

The nose extension is pivoted to the lower end of the back frame by hinge brackets which include abutments engageable with cooperating abutments on the back frame so as to support the loaded platform or nose piece for upward tilting movement when loaded with luggage. In addition, the hinge brackets include support surfaces adapted to rest on the floor when the nose extension extends forwardly from the back frame in loading position, and other angularly related support surfaces adapted to rest on the floor when the nose extension is tilted upwardly into substantial parallelism with the back frame. The last mentioned surfaces extend from a position forwardly to a position rearwardly of the back frame and support the structure in its rest position.

The back frame is provided with wheel brackets which extend rearwardly from its bottom edge and are adapted to engage the floor to support the back frame whenever the truck is in loading or rest position.

The angularly related support surfaces are interconnected by arcuately curved surfaces to provide for rolling on these arcuate surfaces as a loaded truck is moved from loading to transport position.

BRIEF DESCRIPTION OF THE DRAWINGS

FIG. 1 is a perspective view of the hand truck in loading position.

FIG. 2 is a perspective view of the hand truck in rest position.

FIG. 3 is a fragmentary perspective view of the lower rear portion of the truck.

FIG. 4 is a rear elevation of the truck with parts broken away.

FIG. 5 is a side elevation of the truck in loading position with parts broken away.

FIG. 6 is a front elevational view of the truck.

FIG. 7 is a fragmentary sectional view on the line 7—7, FIG. 5.

FIG. 8 is a fragmentary view similar to FIG. 5 showing the nose piece in rest position.

DETAILED DESCRIPTION

Referring first to FIGS. 1–3, the truck comprises a back frame indicated generally at 10 which includes side rails 12 joined at the top by a U-shaped connector 14 carrying a hook 16 from which garment bags may be suspended. The tops of the rails are further interconnected by a generally U-shaped tubular handle 18 the ends of which are fixedly secured in the upper ends of the rails by suitable means indicated at 20. Pivotally connected to the lower end of the back frame 10 is a nose extension 22 which constitutes a platform on which luggage may be loaded. The back frame 10 is provided with a pair of wheels 24 which are located rearwardly of the back frame 10 adjacent the lower edge thereof and forwardly of the wheels 24 is a guard plate 26.

As best seen in FIG. 2, the nose extension is provided by a pair of rails 28 connected by a cross piece 30 and is fixedly connected to the hinge brackets 32 which constitute the pivot connection for the nose piece on the back plate. Wheels 24 are rotatably mounted on a fixed axle 34 carried by wheel support brackets 36 as will be described in connection with FIGS. 4–8.

The back frame 10 is provided at its rear surface with a service box 38 which includes a pivoted container portion 40 pivoted thereto and provided with compartments 41 for receiving baggage checks and the like.

Referring now more particularly to FIGS. 4–8, the details of the construction of the truck will be described. The back frame 10 comprises a front plate 42 secured to the rails 12 by suitable fastening means such as screws 43, and a back plate 44 secured to the rails by screws indicated at 46 which also interconnect with cross bars 48. The lower ends of the cross bars are connected by a lower arch 50 and an upper arch 52 connects the upper ends of the rails of the back frame.

The platform or nose extension 22 includes a plate 54 connected to the rails 28.

Preferably, the plate 42 provided at the forward surface of the back frame, and the plate 54 which lies at the top of the platform or nose piece 22 when in extended loading position are covered with carpeting to provide for protection of luggage transported by the truck.

Fixedly secured to the lower ends of the rails 12 are rearwardly extending wheel support brackets 36. These brackets, as best seen in FIG. 7, are in the form of extrusions and are provided with a first opening 60 for receiving the wheel axle 34, and a second opening 62 intended for receiving a shaft to support large diameter wheels. The openings are provided in grooves indicated at 64 and the axle or shaft 34 is held against rotation by pins 66 which extend through openings in the axle.

The platform or nose extension 22 is pivotally connected to the back frame 10 by hinge brackets 32 which are pivoted to the lower end of the frame by hinge bolts 68.

The wheel support brackets 36, as previously mentioned, are formed by extrusion and include flanges 70 and 72 for receiving the lower ends of channel 74 and 76 which are received in the rails 12. Pivot bolts 68 retain these parts in assembly as well as the lower arch 50 previously described.

The lower ends of the rails 12 carry abutment strip 26 having abutment surface 80 and the pivoted hinge brackets 32 include abutment surfaces 82 which are engageable with the abutment surfaces 80 to limit clockwise swinging movement of the nose piece 22 relative to the back frame 10 from the position shown in FIG. 8. Accordingly, when the platform or nose extension 22 has been loaded with luggage and the handle 18 is moved rearwardly, the surfaces 80 and 82 engage and the platform 22 is tilted counterclockwise to elevated position above the ground. This of course permits movement of the truck on the wheels 24.

With the parts in the position illustrated in FIG. 4, the bottom surface of the platform or nose extension 22 extends parallel and is adapted to rest on the ground or floor. In this Figure the back frame 10 is illustrated as extending vertically with a wheel 24 slightly elevated above the ground. This is not necessarily the rest position of the truck, since the back frame 10 may rotate counterclockwise until the wheels engage the ground, this action being permitted by the slight inclination of the abutment surface 82 provided on the bracket 32.

In FIG. 5 the bracket 32 is provided with a flat support surface 84 which constitutes an extension of the under surface of the nose extension 22 and in loading position the surface 84 and the lower surface of the nose extension rest flat against the floor or other horizontal support surface.

In FIG. 8 the lower end of the back frame 10, the hinge brackets 32, and the nose extension 22 are illustrated in the position which they occupy when the nose extension 22 is lifted to rest position. At this time second support surfaces 86 on the hinge brackets 32 are adapted to rest on the floor or other horizontal support surface and to maintain the truck in upright position. It will be observed that the support surfaces 86 extend between points located well forwardly and well rearwardly of the back frame 10 so as to provide an adequately stabilized support.

The back frame 10 will of course pivot counterclockwise to the illustrated position where the wheels 24 engage the floor, thus arresting the back frame 10 in generally vertical but slightly rearwardly inclined position. The nose extension 22 is also arranged so that when the surface 86 rests on the flat support surface, the nose extension is inclined slightly rearwardly in conformity with the inclination of the back frame 10.

When the platform or nose extension 22 is loaded with luggage rearward movement of the handle 18 will result in movement of the hinge bolt 68 upwardly about the axis of the wheels 24, and engagement between the abutment surfaces 80 and 82 will insure that the platform or nose extension 22 moves upwardly about the axis of the wheels to transfer the load to a clearance position in which it may be transported by the truck.

It will be observed that the abutment surfaces 82 and 86 converge slightly upwardly as viewed in FIG. 5, in which the support surface 84 is illustrated as in horizontal position in engagement with the floor. With this arrangement the back frame 10 may incline backwardwardly to a stabilized position with the wheels 24 engaging the floor while the nose extension or platform 22 is being loaded. At the same time when the truck is collapsed to its rest position with the nose extension or platform 22 swung upwardly, it will be inclined slightly rearwardly due to the inclination of surfaces 82, the engagement between surfaces 80 and 82 determining the rearward inclination assumed by the nose extension 22 when the surface 86 rests in flat engagement on the floor and surfaces 80 and 82 abut.

It will be observed that first support surfaces 84 and second support surfaces 86 define an inclined angle slightly less than 90° so that when surfaces 86 rest on a horizontal surface as shown in FIG. 8, nose extension 22 inclines slightly rearwardly. In addition, surfaces 82 are inclined slightly rearwardly when surfaces 84 rest on a horizontal surface, as shown in FIG. 5, providing for engagement between the surfaces 80 and 82 upon rearward swinging of frame 10.

It will be observed that in both the loading position illustrated in FIG. 5, and in the rest position illustrated in FIG. 8, the hand truck is supported essentially by brackets 32. The pivot means 68 interconnecting the frame and nose extension is in the plane of the back frame and accordingly, while the back frame may tilt slightly counterclockwise from the position illustrated in FIG. 5 until its wheels 24 engage the ground, the back frame is essentially supported by the pivot means 68. The same considerations prevail in the rest position illustrated in FIG. 8. The brackets 32 are thus provided with support surfaces 84 and 86 adapted to support the hand truck in either the loading position in which the nose extension 22 is in contact with the ground, or in the rest position in which the nose extension 22 extends substantially vertically, or is inclined very slightly rearwardly. In addition, brackets 32 are provided with the surfaces 82 adapted to engage the surfaces 80 of the strap 26, the surfaces 80 and 82 constituting the abutment means which limit pivotal movement of the nose extension away from the back frame to a transport position in which the nose extension extends generally away from the plane of the back frame.

The construction is characterized by its ruggedness, its simplicity, and by the stability of the construction both in the loading position indicated in FIG. 5, and the rest position indicated in FIG. 8. In addition, in the transport position in which the back frame 10 may be swung rearwardly to a position in which the weight of luggage engageable at this time both with the nose extension 22 and the back frame 10, is well balanced with respect to the axis of the wheels 24.

What I claim as my invention is:

1. A hand truck intended primarily for luggage comprising an elongated generally rectangular back frame having a substantially vertical rest position and rearwardly inclined position for transporting luggage thereon, a handle at the upper end of said frame, a pair of wheel support brackets fixedly connected to and extending rearwardly from the lower end of said frame, axially aligned wheels mounted on said brackets, a nose extension having an inner end pivotally connected to said frame adjacent the lower end thereof of an axis spaced from the axes of said wheels and movable between a rest position in which it is disposed substantially against the front side of said frame and a transport position in which it extends forwardly from the lower end of said frame, hinge brackets fixedly connected to and extending rearwardly from the inner end thereof, said hinge brackets having pivot means connected to said frame adjacent the lower end of said frame, abutment surfaces forwardly of and above said pivot means, said hinge brackets having abutments thereon located substantially above the pivot axis of said pivot means engageble with the abutment surfaces on said frame when said nose extension extends forwardly from said frame in transport position to maintain said extension in load sustaining operating position.

2. A truck as defined in claim 1 in which said hinge brackets are also provided with first support surfaces substantially coplanar with the bottom surface of said nose extension and which extend beneath the axis of said pivot means when said nose extension is in engagement with a floor, said first support surfaces being so shaped and located relative to said wheels to provide slight rearward inclination of said frame when said nose extension is in loading position on the floor.

3. A truck as defined in claim 2 in which said hinge brackets are provided with second support surfaces arranged to extend in a horizontal plane between points located forwardly and rearwardly of said frame when said frame is in its vertical rest position to support said frame in such position while said second support surfaces of said hinge brackets are on the floor, and said nose extension extends upwardly closely adjacent said frame.

4. A truck as defined in claim 3, said nose extension being maintained in substantially vertical position by the said second support surfaces of said hinge brackets while said second support surfaces are resting on the floor.

5. A truck as defined in claim 4, said first hinge bracket support surfaces being arranged to maintain said wheels above a floor surface on which said first hinge bracket support surfaces are supported while said frame extends vertically.

6. A truck as defined in claim 5 in which said first and second hinge bracket support surfaces are joined by smoothly curved surfaces to provide for rocking of said truck thereon as it is moved while loaded from loading position to transport position in which said frame is rearwardly and upwardly inclined and said nose extension is forwardly and upwardly inclined.

7. A truck as defined in claim 1 in which said hinge brackets are flat and are formed of generally U-shape in which one leg of the U is fixedly secured to said nose extension, the other leg of said U is pivoted by said pivot means to the lower edge of said back frame, said back frame having at its lower edge an abutment strip extending horizontally laterally beyond said hinge brackets, the rear surface of said strip forming the aforesaid abutment surfaces, said brackets having the legs of said U located at opposite sides of said strip when said nose extension is swung against said back frame.

8. A truck as defined in claim 7 in which the legs of said U which are pivoted to said back frame include the aforesaid abutments, said abutments being spaced substantially above the axis of said pivot means when said nose extension extends forwardly and engageable with the rear abutment surfaces of said strip.

9. A truck as defined in claim 1 in which the pivot means connecting the hinge brackets to said frame are located substantially forwardly of and slightly below the axes of said wheels when said frame extends substantially vertically.

10. A truck as defined in claim 9 in which said pivot means directly connect said wheel support brackets and said hinge brackets.

11. A hand truck comprising a back frame having a generally vertical rest and loading position and a rearwardly inclined transport position, wheels fixedly secured to the lower end of said frame and having their peripheral portions extending beyond such lower end, a nose extension having an inner end pivotally connected to the lower end of said frame and having a forwardly extending horizontal loading position, a generally vertical rest position, and a forwardly and upwardly inclined transport position in which it extends generally away from said frame, a pair of hinge brackets fixedly secured to the said inner end of said nose extension, pivot means connecting said brackets to said frame, said brackets having support surfaces extending horizontally when said nose extension extends generally vertically to constitute the main support for both said frame and nose extension at such time, and abutment means acting between said frame and said hinge brackets to limit swinging movement of said nose extension to a load carrying position in which it extends generally away from the plane of said back frame.

12. A truck as defined in claim 11 comprising wheel support brackets fixedly secured to the lower end of said frame to extend rearwardly therefrom, said wheels being carried by said wheel support brackets with the axis of rotation of said wheels spaced substantially rearwardly from the plane of said frame, whereby rearward tilting of said frame from substantially vertical loading position elevates said frame and nose extension.

13. A truck as defined in claim 12 in which said pivot means are located substantially in the plane of said back frame.

14. A truck as defined in claim 11 in which said hinge brackets have additional support surfaces, said additional support surfaces being flat and extending horizontally when said nose extension is in forwardly extending ground-engaging loading position, and positioned to underlie the pivot means connecting said back frame and said nose extension and to support said frame in its substantially vertical rest and loading position.

15. A truck as defined in claim 14 comprising wheel support brackets fixedly secured to the lower end of said frame to extend rearwardly therefrom, said wheels being carried by said wheel support brackets with the axis of rotation of said wheels spaced substantially rearwardly from the plane of said frame, whereby rearward tilting of said frame from substantially vertical loading position elevates said frame and nose extension, said frame being slightly tiltable rearwardly from a vertical position about the axis of said pivot means until its wheels engage the ground.

* * * * *